United States Patent
Numajiri (10) Patent No.: US 8,608,442 B2
(45) Date of Patent: Dec. 17, 2013

(54) PITCH DRIVING UNIT FOR WIND-TURBINE ROTOR BLADE AND WIND POWER GENERATOR EQUIPPED WITH THE SAME

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/287,455

(22) Filed: Nov. 2, 2011

(65) Prior Publication Data

US 2012/0134827 A1 May 31, 2012

Related U.S. Application Data

(63) Continuation of application No. PCT/JP2011/070594, filed on Sep. 9, 2011.

(51) Int. Cl.
*F03D 7/04* (2006.01)

(52) U.S. Cl.
USPC .......................... 416/42; 416/157 A; 416/158

(58) Field of Classification Search
USPC ...... 416/1, 31, 42, 156, 157 R, 157 A, 157 B, 416/158; 60/478
See application file for complete search history.

(56) References Cited

U.S. PATENT DOCUMENTS

| 7,658,594 | B2 | 2/2010 | Christensen et al. |
| 2010/0014972 | A1* | 1/2010 | Steffensen ...................... 416/31 |
| 2010/0232964 | A1* | 9/2010 | Geiger .......................... 416/156 |

FOREIGN PATENT DOCUMENTS

| DE | 10146968 A1 * | 6/2002 |
| JP | 55091773 A | 7/1980 |
| JP | 62184206 A | 8/1987 |
| JP | 7042663 A | 2/1995 |
| JP | 2002276526 A | 9/2002 |
| JP | 2002276535 A | 9/2002 |
| WO | WO 2008000882 A1 * | 1/2008 |

OTHER PUBLICATIONS

International Search Report of PCT/JP2011/070594 dated Dec. 13, 2011.

* cited by examiner

*Primary Examiner* — Edward Look
*Assistant Examiner* — Jesse Prager
(74) *Attorney, Agent, or Firm* — Kanesaka Berner & Partners, LLP (57) ABSTRACT

A pitch driving unit according to the present invention is equipped with hydraulic actuators that change the pitch angles of wind turbine blades; a hydraulic pump that supplies oil to the hydraulic actuators; a high-pressure oil line that guides the oil discharged from the hydraulic pump to the hydraulic actuators; a low-pressure oil line that returns the oil discharged from the hydraulic actuators to the hydraulic pump; and a pressure control unit that stores a surplus amount of the oil and that refills the low-pressure oil line with the oil so as not to generate negative pressure at an oil intake portion of the hydraulic pump, wherein the hydraulic actuators 15, the hydraulic pump, the high-pressure oil line, the low-pressure oil line, and the pressure control unit constitute a closed hydraulic circuit that does not open to the atmosphere, the closed hydraulic circuit being filled with the oil.

4 Claims, 7 Drawing Sheets

PITCH DRIVING UNIT FOR WIND-TURBINE ROTOR BLADE AND WIND POWER GENERATOR EQUIPPED WITH THE SAME

CROSS REFERENCE TO RELATED APPLICATIONS

This application is a continuation application of PCT/JP2011/070594 filed on Sep. 9, 2011, the contents of which is hereby incorporated by its reference.

BACKGROUND OF THE INVENTION

1. Field of the Invention

The present invention relates to a pitch driving unit for a wind-turbine rotor blade in which the pitch angles of wind turbine blades are changed by hydraulic actuators, and to a wind power generator equipped with the same.

2. Description of Related Art

Standard propeller-type wind power generators are equipped with a wind-turbine rotor blade in which a plurality of wind turbine blades are mounted to a rotor head serving as a rotation center. These wind power generators are configured in such a manner that the wind-turbine rotor blade is rotatably supported by a nacelle that is supported at the upper end of a tower in a manner allowing yawing, and the wind-turbine rotor blade rotates by receiving wind power, so that a generator installed in the nacelle is driven to generate electricity. In the case of an up-wind wind power generator, yaw driving control of the nacelle is performed so that the rotation center axis of the rotor head (wind-turbine rotor blade) is constantly pointed in the windward direction to allow efficient power generation.

In recent years, as disclosed in U.S. Pat. No. 7,658,594 and so on, a pitch driving unit is provided which rotates individual wind turbine blades provided on the wind-turbine rotor blade relative to the rotor head by using a hydraulic driving source or the like to change the pitch angles (attack angles) of the individual wind turbine blades. With this pitch driving unit, when the wind is weak, the wind turbine blades are rotated to a fine side at which the pitch angles are increased, and when the wind is strong, the wind turbine blades are rotated to a feather side at which the pitch angles are decreased. This allows the generator to efficiently generate electricity in the vicinity of a desired rotational speed.

The pitch driving unit of the wind power generator disclosed in U.S. Pat. No. 7,658,594 is equipped with hydraulic cylinders serving as actuators for rotating the individual wind turbine blades, a hydraulic pump that supplies oil to the hydraulic cylinders, a high-pressure oil line that guides the oil discharged from the hydraulic pump to the hydraulic actuators, a low-pressure oil line that returns the oil discharged from the hydraulic actuators to the hydraulic pump, and an oil tank that stores the oil, all of which are installed inside the rotor head.

Accommodating all the components constituting the pitch driving unit inside the rotor head in this manner eliminates the need to pass a hydraulic line between the rotating rotor head and the fixed nacelle via a rotary joint. This can therefore omit the rotary joint, which is expensive and is prone to cause oil leakage, thus resulting in much time for maintenance, and thus considerably reducing the manufacturing cost of the wind power generator and eliminating the portion having the highest risk of oil leakage.

The pitch driving unit of U.S. Pat. No. 7,658,594 is provided with a snorkel-like air bleed pipe in an oil tank to allow the oil tank to be disposed in the rotating rotor head. The air bleed pipe is supported so as to be rotatable about the rotation center axis of the rotor head. A weight is provided at the opposite side of the vent hole of the air bleed pipe, with the rotation center axis of the air bleed pipe interposed therebetween. The mass of this weight allows the vent hole of the air bleed pipe to always project higher than the oil level in the oil tank irrespective of the rotation of the oil tank, thus allowing good ventilation.

However, the pitch driving unit disclosed in U.S. Pat. No. 7,658,594 has the possibility that the oil may spout out from the air bleed pipe, even if it is of a rotating type, to the interior of the rotor head depending on the degree of waviness of the oil surface, thus contaminating the interior of the rotor head because the oil tank has a very complicated structure, and moreover, it opens to the atmosphere through the air bleed pipe.

Furthermore, there is the problem that, even if the oil does not spout directly from the air bleed pipe, oil mist (mist-like oil) in the oil tank comes out of the air bleed pipe during ventilation with the air bleed pipe, thus contaminating the interior of the rotor head with the oil content. Moreover, because the oil is always mixed with air in the rotating oil tank, there are the problems that the oil is degraded by oxidization and that foreign substances tend to get mixed therein.

Furthermore, even if the oil tank is installed not in the rotor head but in the nacelle, there is a high possibility that the hydraulic pump takes in the air in the oil tank when the oil level becomes low because the oil tank opens to the atmosphere, and thus air is present on the surface of the stored oil. This hinders the correct operation of the pitch driving unit; therefore, it is necessary to consider increasing the amount of oil stored in the oil tank and to dispose the intake portion of the oil pump deep in the stored oil, so that the oil pump sucks in as little air as possible.

This increases the size of the oil tank, and thus, many times as much as oil as the pitch driving unit actually needs must be stored. This impairs the interior layout of the rotor head or the nacelle in which the oil tank is disposed, thus making it difficult to design, and increases the amount of oil consumed, which is not desirable in terms of cost and environment.

BRIEF SUMMARY OF THE INVENTION

The present invention has been made to solve the above problems, and an object thereof is to provide a pitch driving unit for a wind-turbine rotor blade in which the intake of air by the hydraulic pump, contamination due to oil, and degradation of the oil and intrusion of foreign substances are prevented, and in which the amount of oil consumed is reduced with a simple and low-cost configuration, which can thus contribute to cost reduction and environmental preservation, as well as a wind power generator equipped with the same.

The present invention provides the following solutions to achieve the above objects.

Specifically, a first aspect of a pitch driving unit for a wind-turbine rotor blade according to the present invention is a pitch driving unit for a wind-turbine rotor blade in which a wind turbine blade is mounted to a rotor head that is rotatably supported by and rotates about a nacelle, the pitch driving unit including a hydraulic actuator that changes the pitch angle of the wind turbine blade; a hydraulic pump that supplies oil to the hydraulic actuator; a high-pressure oil line that guides the oil discharged from the hydraulic pump to the hydraulic actuator; a low-pressure oil line that returns the oil discharged from the hydraulic actuator to the hydraulic pump; and a pressure control unit that stores a predetermined surplus amount of the oil and that refills the low-pressure oil line with the stored oil so as not to generate negative pressure at an oil intake portion of the hydraulic pump, wherein the hydraulic actuator, the hydraulic pump, the high-pressure oil line, the low-pressure oil line, and the pressure control unit constitute a closed hydraulic circuit that does not open to the atmosphere, the closed hydraulic circuit being filled with the oil.

With the above configuration, the closed hydraulic circuit which is constituted by the hydraulic actuator, the hydraulic pump, the high-pressure oil line, the low-pressure oil line, and the pressure control unit and which does not open to the atmosphere is filled with oil, and the low-pressure oil line, that is, the line through which the hydraulic pump takes in oil, is refilled with oil by the pressure control unit so that no negative pressure is generated at the oil intake portion of the hydraulic pump.

Thus, since the closed hydraulic circuit that does not open to the atmosphere is filled with oil, and the low-pressure oil line that constitutes the closed hydraulic circuit is refilled with oil from the pressure control unit, thus preventing the generation of negative pressure at the oil intake portion of the hydraulic pump, there is no possibility that the hydraulic pump takes in air when taking in oil from the low-pressure oil line even if the oil stored in the pressure control unit is set to a minimum required amount. Thus, this can reduce the amount of oil used, thus making a great contribution to cost reduction and environmental reservation. Moreover, since the oil that fills the closed hydraulic circuit does not leak outside, contamination due to oil can be prevented. Furthermore, since the oil is not exposed to air, degradation of the oil and the intrusion of foreign substances can be prevented.

In a second aspect of the pitch driving unit for the wind-turbine rotor blade according to the present invention, in the first aspect, the pressure control unit refills the low-pressure oil line with the stored oil while applying a minimum pre-pressure that causes no negative pressure at the oil intake portion of the hydraulic pump.

With the above configuration, since the oil stored in the pressure control unit is supplied to the low-pressure oil line while the minimum pre-pressure is being applied, the generation of negative pressure at the oil intake portion of the hydraulic pump can be more effectively prevented. Since the pre-pressure may be significantly lower than the discharge pressure of the hydraulic pump, no load is exerted on the hydraulic pump.

In a third aspect of the pitch driving unit for the wind-turbine rotor blade according to the present invention, in the second aspect, the pressure control unit includes an oil tank installed at the nacelle side; a connecting line that connects the oil tank to the low-pressure oil line; and a gravity prepressurizing member that applies the pre-pressure to the surface of the oil stored in the oil tank by gravity, wherein the low-pressure oil line is installed at the rotor head side; and the connecting line is connected to the low-pressure oil line via a rotary joint.

The above configuration allows a constant pre-pressure to be applied to the low-pressure oil line while considerably simplifying the configuration of the pressure control unit. The rotary joint provided at the connecting line that connects the oil tank and the low-pressure oil line may be an inexpensive low-pressure joint because it need only seal a pre-pressure that is significantly lower than the discharge pressure of the hydraulic pump, thus allowing the manufacturing cost of the pitch driving unit to be remarkably reduced.

In a fourth aspect of the pitch driving unit for the wind-turbine rotor blade according to the present invention, in the second aspect, the pressure control unit includes a variable-capacity oil reservoir container which is connected to the low-pressure oil line and which stores a predetermined amount of the oil; a capacity changing mechanism that changes the capacity of the oil reservoir container; pressure measuring means that measures the pressure in the low-pressure oil line; and control means that controls the capacity changing mechanism while detecting pressure data from the pressure measuring means so that the pre-pressure is applied to the low-pressure oil line.

With the above configuration, the pressure data of the low-pressure oil line is measured by the pressure measuring means, the capacity changing mechanism is controlled by the control means on the basis of the pressure data, and the capacity of the oil reservoir container is changed such that the capacity changing mechanism is controlled so that a pre-pressure is applied to the low-pressure oil line. Therefore, an appropriate pre-pressure can be applied to the low-pressure oil line, thereby assuredly preventing the generation of negative pressure at the oil intake portion of the oil hydraulic pump.

In a fifth aspect of the pitch driving unit for the wind-turbine rotor blade according to the present invention, in the first aspect, the hydraulic actuator, the hydraulic pump, the high-pressure oil line, the low-pressure oil line, and the pressure control unit are all accommodated in the rotor head.

With the above configuration, the entire pitch driving unit can be formed as a unit and can be accommodated in the rotor head, thus eliminating the need for a hydraulic line between the nacelle and the rotor head, which can eliminate the rotary joint, thus allowing the manufacturing cost of the pitch driving unit to be remarkably reduced. Since the entire pitch driving unit can be formed as a unit, the need for the work of connecting a hydraulic line at the construction site of the wind power generator can be eliminated, and thus, contamination inside the hydraulic pipe can be prevented.

A wind power generator according to the present invention is equipped with the pitch driving unit for the wind-turbine rotor blade according to any of the first to fifth aspects. This can prevent the hydraulic pump of the pitch driving unit from taking in air, allowing the pitch driving unit to operate reliably. Moreover, this can prevent contamination due to oil, degradation of the oil, and the intrusion of foreign substances and can reduce the amount of oil consumed, thus contributing to cost reduction and environmental preservation.

As described above, with the pitch driving unit for the wind-turbine rotor blade according to the present invention, the intake of air by the hydraulic pump, contamination due to oil, degradation of the oil, and the intrusion of foreign substances can be prevented, and the amount of oil consumed can be reduced with a simple and low-cost configuration, which can thus contribute to cost reduction and environmental preservation

DETAILED DESCRIPTION OF THE INVENTION

Embodiments will be described hereinbelow with reference to FIGS. 1 to 8.

First Embodiment

Figure 1:
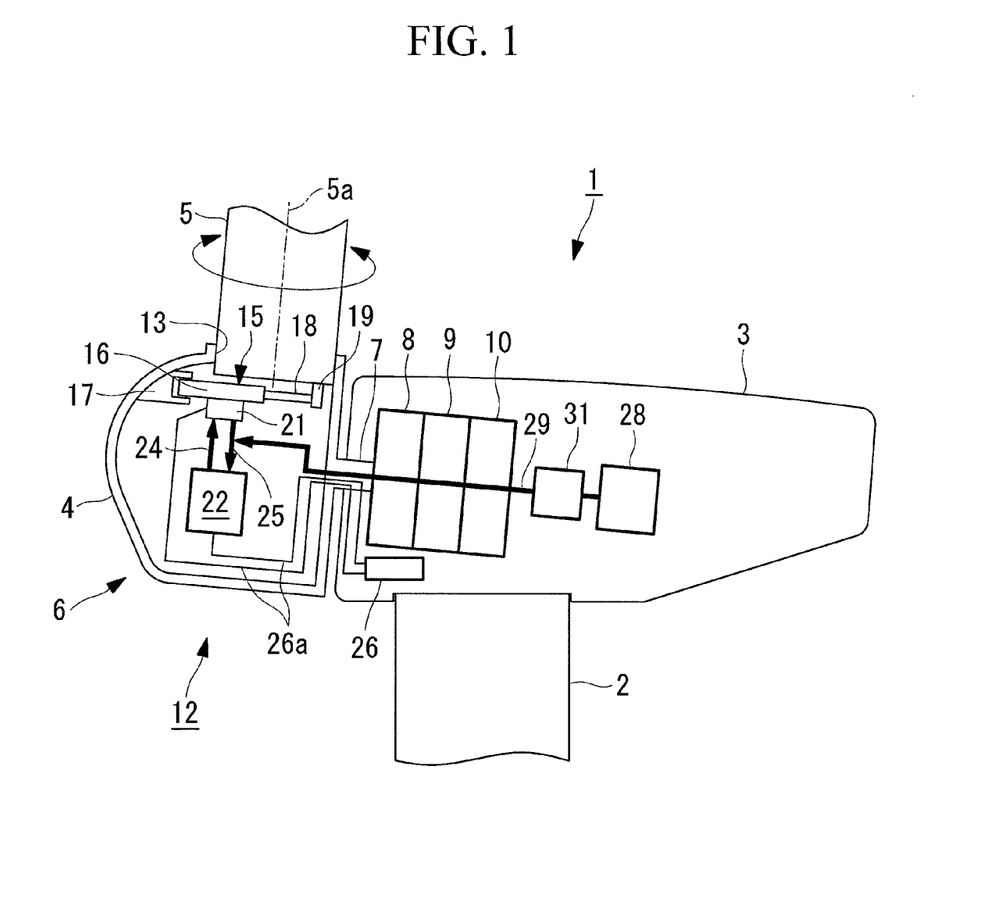
FIG. 1 is a side view showing an example of a wind power generator to which a first embodiment of a pitch driving unit for a wind-turbine rotor blade is applied.

FIG. 1 is a side view showing an example of a wind power generator (wind turbine) to which a pitch driving unit for a wind-turbine rotor blade according to a first embodiment is applied. The wind power generator 1 is configured such that a nacelle 3 is supported at the upper end of a tower 2, in a manner allowing yawing, a rotor head 4 is supported by the nacelle 3 so as to be rotatable about a substantially horizontal rotation axis thereof, and a plurality of (for example, three) wind turbine blades 5 extending in a radiating pattern are mounted to the rotor head 4 to constitute a wind-turbine rotor blade 6.

The nacelle 3 accommodates a main bearing 8 that supports a rotating shaft 7 of the rotor head 4, a gearbox 9, and a generator 10. When the wind-turbine rotor blade 6 rotates upon receiving wind, the rotation of the rotating shaft 7 of the rotor head 4 is appropriately increased in speed and is transmitted to the generator 10, so that the generator 10 is driven to generate electricity. The wind power generator 1 is of an up-wind type in which the orientation of the nacelle 3 is controlled by a yawing device (not shown) and a control unit so as to constantly point the wind-turbine rotor blade 6 to an upwind side to allow efficient power generation.

Furthermore, this wind power generator 1 is provided with a pitch driving unit 12. As is well known, the pitch driving unit 12 drives the individual wind turbine blades 5 in a twisting direction relative to the rotor head 4 to rotate them between a fine side at which the pitch angles are large and a feather side at which the pitch angles are small. This can increase the power generation efficiency by rotating the wind-turbine rotor blade 6 at a desired rotational speed according to wind conditions, operating conditions, etc. and enables the wind-turbine rotor blade 6 to be stopped during strong wind.

The rotor head 4 is a capsule-like component whose interior is hollow and which is integrally formed of metal by casting, and in the peripheral wall surface thereof, three circular wind-turbine-blade mounting holes 13 for mounting the wind turbine blades 5 are formed at intervals of 120°. The individual wind turbine blades 5 are mounted in the wind-turbine-blade mounting holes 13 via ring-shaped blade rotation bearings (not shown), and thus, the wind turbine blades 5 can smoothly rotate about axes 5a thereof.

The pitch driving unit 12 is equipped with hydraulic-cylinder-like hydraulic actuators 15 that extend and retract hydraulically. Three hydraulic actuators 15 are provided in correspondence with the three wind turbine blades 5, and a cylinder 16 of each of the hydraulic actuators 15 is rotatably connected to the interior of the rotor head 4 via a cylinder bracket 17, and the distal end of an extendable rod 18 that extends from and retracts into the cylinder 16 is rotatably connected to the trailing end of the wind turbine blade 5 via an eccentric pin 19. When hydraulic pressure is applied to the hydraulic actuator 15, so that the extendable rod 18 extends from and retracts into the cylinder 16, the wind turbine blade 5 rotates about the axis 5a by a crank motion, and thus, the pitch angle of the wind turbine blade 5 is changed.

The cylinder 16 of the hydraulic actuator 15 is integrally provided with a hydraulic control valve 21. On the other hand, the rotor head 4 accommodates one hydraulic pump 22 that supplies oil to the three hydraulic actuators 15. A high-pressure oil line 24 and a low-pressure oil line 25 are provided between the hydraulic pump 22 and the hydraulic control valves 21. The high-pressure oil line 24 is a line that guides the oil discharged from the hydraulic pump 22 to the hydraulic actuators 15, and the low-pressure oil line 25 is a line that returns the oil discharged from the hydraulic actuators 15 to the hydraulic pump 22. Both the high-pressure oil line 24 and the low-pressure oil line 25 are disposed inside the rotor head 4.

Furthermore, a control unit 26 for operating the hydraulic pump 22 and the hydraulic control valves 21 is installed in the nacelle 3. The control unit 26 may be disposed in the rotor head 4. In the case where the control unit 26 is installed in the nacelle 3, control lines 26a that electrically connect the control unit 26 with the hydraulic pump 22 and the hydraulic control valves 21 are disposed so as to pass through the rotating shaft 7 of the rotor head 4 via a slip ring (not shown).

Furthermore, a pressure control unit 28 is installed in the nacelle 3, and a connecting line 29 extending from the pressure control unit 28 is connected to the low-pressure oil line 25 inside the rotor head 4. Since the pressure control unit 28 is fixed inside the stationary nacelle 3, and the low-pressure oil line 25 is provided in the rotating rotor head 4, a rotary joint 31 is provided at an intermediate point in the connecting line 29 that connects the pressure control unit 28 and the low-pressure oil line 25 together. The rotary joint 31 is a pipe joint member with a known structure that allows the low-pressure oil line 25 to rotate relative to the pressure control unit 28 while preventing the oil in the connecting line 29 from leaking outside.

Figure 2:
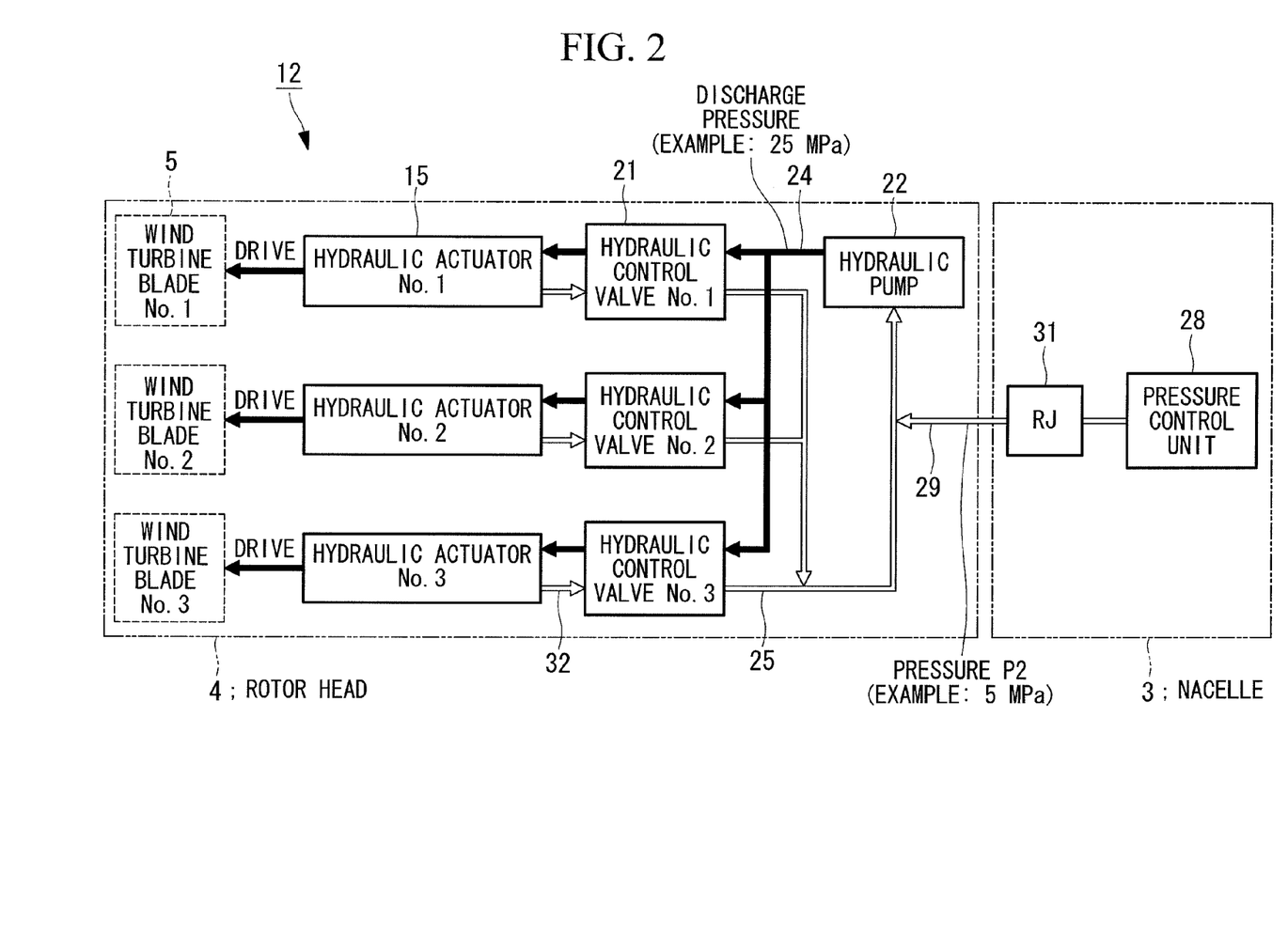
FIG. 2 is a block diagram showing, in outline, the configuration of the pitch driving unit shown in FIG. 1.

As shown in FIG. 2, a closed hydraulic circuit 32, which does not open to the atmosphere, is constituted by the hydraulic actuators 15 (hydraulic control valves 21), the hydraulic pump 22, the high-pressure oil line 24, the low-pressure oil line 25, and the pressure control unit 28, and this closed hydraulic circuit 32 is filled with oil. The pressure control unit 28 stores a predetermined amount of surplus oil and refills the low-pressure oil line 25 with the stored oil while applying a pre-pressure P2, to be described later, so as not to generate negative pressure at the oil intake portion of the hydraulic pump 22, that is, the connecting portion of the low-pressure oil line 25. In FIG. 2, the three wind turbine blades 5, hydraulic actuators 15, and hydraulic control valves 21 are each given reference signs No. 1 to No. 3.

Figure 3:
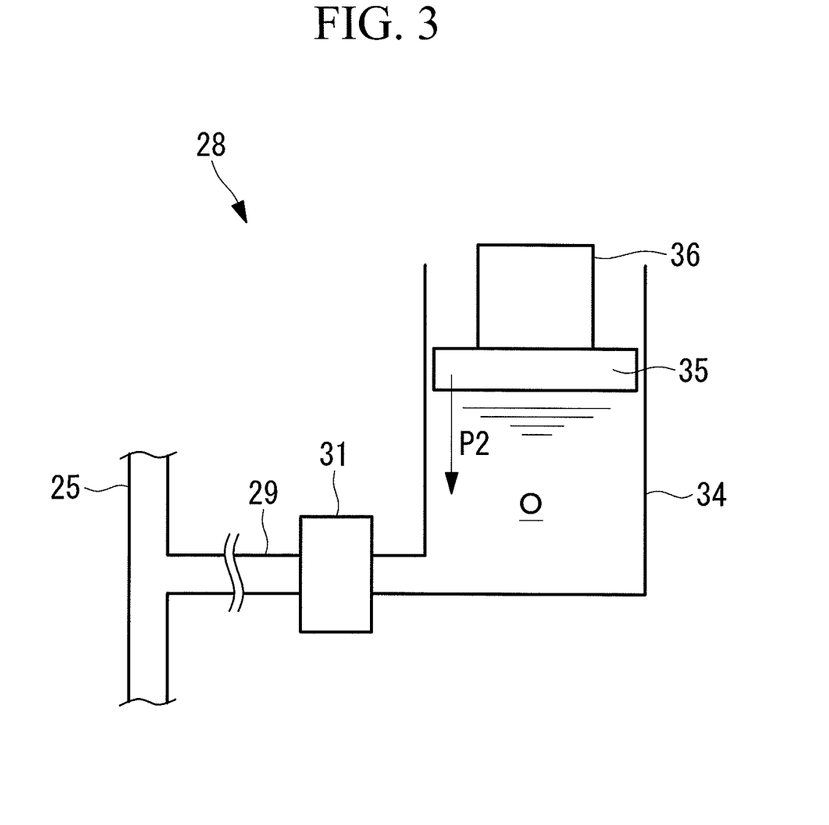
FIG. 3 is a longitudinal sectional view showing, in outline, the configuration of a pressure control unit shown in FIGS. 1 and 2.

FIG. 3 is a longitudinal sectional view showing, in outline, the configuration of the pressure control unit 28 shown in FIGS. 1 and 2. The pressure control unit 28 is equipped with an oil tank 34 that is fixed inside the nacelle 3 and opens upwards. This oil tank 34 has a predetermined capacity, in which, for example, several liters of surplus oil O, is stored. The connecting line 29 extends from the bottom of the oil tank 34, and the upper opening of the oil tank 34 is hermetically sealed by a sliding lid 35 (gravity pre-pressurizing member), on which a weight 36 having a predetermined mass is placed.

The sliding lid 35 is slidable in the vertical direction in the oil tank 34, and the predetermined pre-pressure P2 is applied to the oil O stored in the oil tank 34 due to the mass of the weight 36. The pre-pressure P2 may be significantly lower than the discharge pressure P1 of the hydraulic pump 22. For example, if the discharge pressure P1 of the hydraulic pump 22 is 25 MPa, the pre-pressure P2 is set to about 5 MPa.

In the thus-configured pitch driving unit 12, the hydraulic pump 22 and the hydraulic actuators 15 are controlled by the control unit 26, so that the pitch angles of the wind turbine blades 5 are changed. The oil discharged from the hydraulic pump 22 is fed to the hydraulic control valves 21 of the hydraulic actuators 15 through the high-pressure oil line 24, and the direction and amount of extension and retraction of the extendable rods 18 of the hydraulic actuators 15 are determined by having the control unit 26 control the switching of the hydraulic control valves 21. For example, when the wind turbine blades 5 are to be rotated from the feather side at which the pitch angles are small to the fine side at which the pitch angles are large, the extendable rods 18 are extended, and in contrast, when the wind turbine blades 5 are to be rotated from the fine side to the feather side, the extendable rods 18 are retracted. The oil discharged from the hydraulic actuators 15 is taken into the hydraulic pump 22 through the low-pressure oil line 25 and circulates in the closed hydraulic circuit 32.

The pressure control unit 28 refills the low-pressure oil line 25 with the oil O stored in the oil tank 34 through the connecting line 29 while constantly applying the minimum pre-pressure P2, as described above, so that negative pressure is not generated at the oil intake portion of the hydraulic pump 22, that is, the portion at which the low-pressure oil line 25 is connected to the hydraulic pump 22, due to the suction force of the hydraulic pump 22. The height of the oil O in the oil tank 34 decreases when the extendable rods 18 of the hydraulic actuators 15 extend and increases when the extendable rods 18 retracts.

As described above, in this pitch driving unit 12, the closed hydraulic circuit 32, which does not open to the atmosphere and which is constituted by the hydraulic actuators 15 (hydraulic control valves 21), the hydraulic pump 22, the high-pressure oil line 24, the low-pressure oil line 25, and the pressure control unit 28, is filled with oil; and the oil O in the oil tank 34 refills the low-pressure oil line 25 while the minimum pre-pressure P2 that causes no negative pressure at the oil intake portion of the hydraulic pump 22 is applied to the low-pressure oil line 25, that is, the line through which the hydraulic pump 22 takes in oil, by the pressure control unit 28.

Thus, since the low-pressure oil line 25 that constitutes the closed hydraulic circuit 32 is refilled with the oil O from the pressure control unit 28, thus preventing the generation of negative pressure at the oil intake portion of the hydraulic pump 22, there is no possibility that the hydraulic pump 22 takes in air and generates negative pressure when taking in oil from the low-pressure oil line 25 even if the oil O stored in the pressure control unit 28 is set to a minimum required amount.

Accordingly, this can reduce the amount of oil used in the entire pitch driving unit 12, thus making a great contribution to cost reduction and environmental reservation. Moreover, since the oil that fills the closed hydraulic circuit 32 does not leak outside, contamination due to oil can be prevented. Furthermore, since the oil is not exposed to air, degradation of the oil and the intrusion of foreign substances can be prevented.

Since the oil O stored in the pressure control unit 28 is supplied to the low-pressure oil line 25 while the predetermined pre-pressure P2 is being applied due to not only free-fall (its own weight) but also the mass of the weight 36 placed on the sliding lid 35, the generation of negative pressure at the oil intake portion of the hydraulic pump 22 can be assuredly prevented. Since the pre-pressure P2 may be significantly lower than a discharge pressure P1 of the hydraulic pump 22, no load is exerted on the hydraulic pump 22.

Furthermore, the pressure control unit 28 is equipped with the oil tank 34 disposed at the nacelle 3 side, the connecting line 29 that connects the oil tank 34 to the low-pressure oil line 25, and the sliding lid 35 and the weight 36 that apply the pre-pressure P2 to the liquid surface of the oil O stored in the oil tank 34 due to gravity, wherein the low-pressure oil line 25 is disposed at the rotor head 4 side, and the connecting line 29 is connected to the low-pressure oil line 25 via the rotary joint 31.

This therefore allows a constant pre-pressure P2 to be applied to the low-pressure oil line 25 while considerably simplifying the configuration of the pressure control unit 28. The rotary joint 31 provided at the connecting line 29 that connects between the oil tank 34 and the low-pressure oil line 25 may be an inexpensive low-pressure joint because it need only seal the pre-pressure P2, which is significantly lower than the discharge pressure P1 of the hydraulic pump 22, thus allowing the manufacturing cost of the pitch driving unit 12 to be remarkably reduced. Also, since the pre-pressure P2 is low, the rotary joint 31 is less prone to oil leakage, thus having good maintainability.

Second Embodiment

Figure 4:
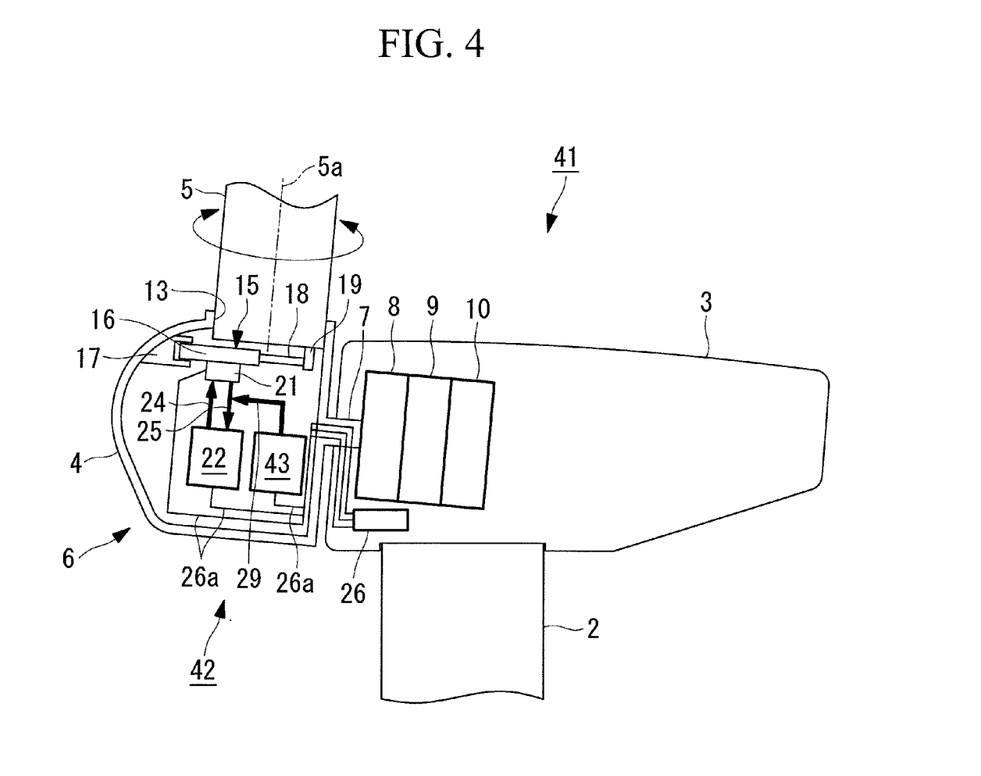
FIG. 4 is a side view of a wind power generator to which a second embodiment of a pitch driving unit for a wind-turbine rotor blade is applied.

FIG. 4 is a side view of a wind power generator 41 to which a wind-turbine rotor blade pitch driving unit according to a second embodiment is applied. Since the wind power generator 41 is the same as the wind power generator 1 of the first embodiment shown in FIG. 1, except for the configuration of a pitch driving unit 42, the same reference signs are given to the components, and descriptions thereof will be omitted.

The pitch driving unit 42 is the same as the pitch driving unit 12 of the first embodiment in that it is equipped with the hydraulic actuators 15, the hydraulic pump 22, the high-pressure oil line 24, the low-pressure oil line 25, and the pressure control unit 43. However, it differs in that the pressure control unit 43 is accommodated in the rotor head 4. Specifically, the foregoing components 15, 22, 24, 25, and 43 that constitute the pitch driving unit 42 are all accommodated together in the rotor head 4.

The high-pressure oil line 24 and the low-pressure oil line 25 are disposed between the single hydraulic pump 22 and the hydraulic control valves 21 of the three hydraulic actuators 15 installed inside the rotor head 4. The connecting line 29 extending from the pressure control unit 43, which is also installed inside the rotor head 4, is connected to the low-pressure oil line 25.

Figure 5:
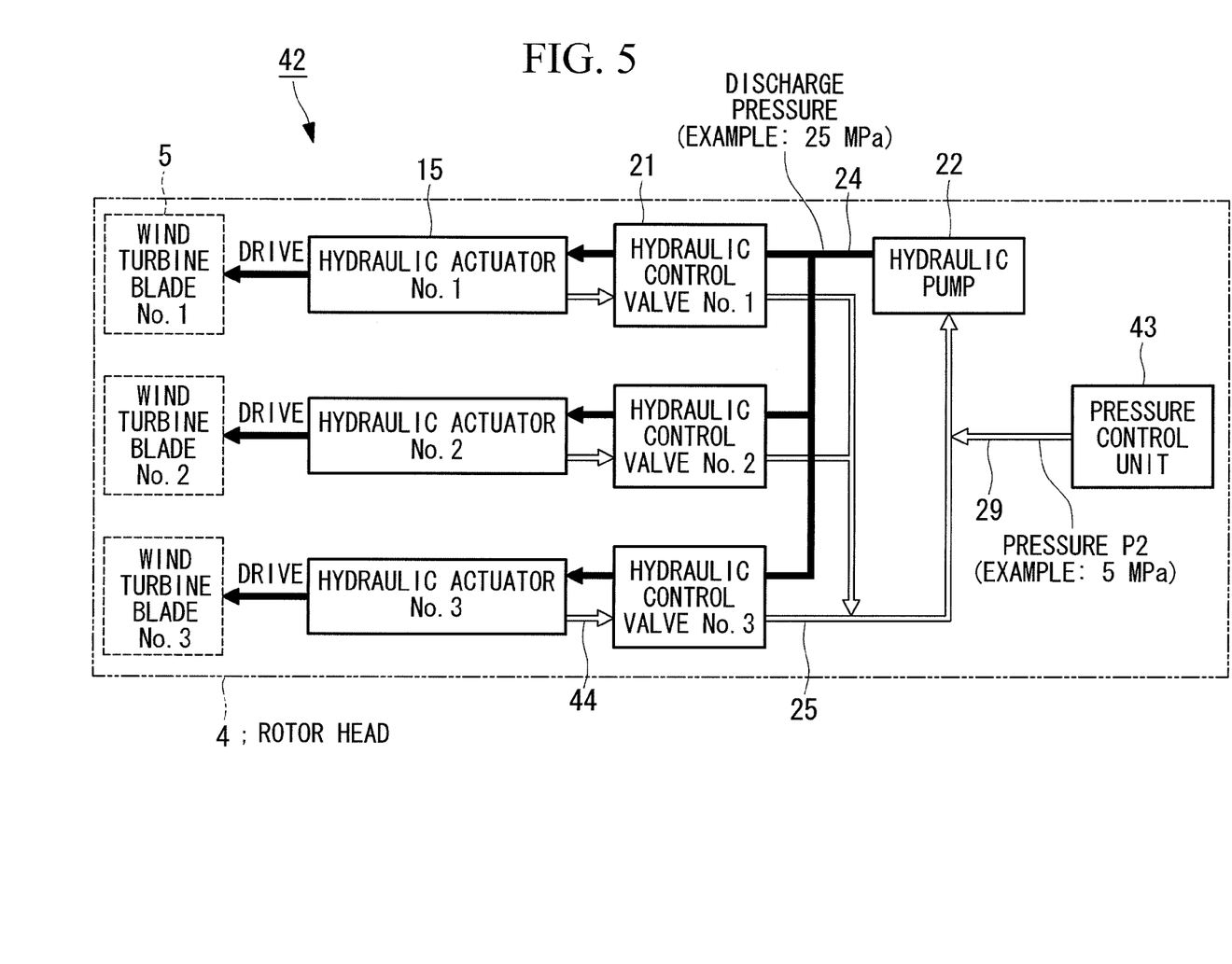
FIG. 5 is a block diagram showing, in outline, the configuration of the pitch driving unit shown in FIG. 4.

As shown in FIG. 5, a closed hydraulic circuit 44, which does not open to the atmosphere, is constituted by the hydraulic actuators 15 (hydraulic control valves 21), the hydraulic pump 22, the high-pressure oil line 24, the low-pressure oil line 25, and the pressure control unit 43, and the closed hydraulic circuit 44 is filled with oil.

Since the pressure control unit 43 is accommodated in the rotor head 4 and rotates together with the wind turbine blades 5, the structure for applying the pre-pressure P2 to the low-pressure oil line 25 using gravity, as with the pressure control unit 28 of the first embodiment, cannot be applied thereto. Therefore, the pitch driving unit 42 of the second embodiment is configured to be capable of applying the pre-pressure P2 to the low-pressure oil line 25 even if it is turned upside down.

Figure 6:
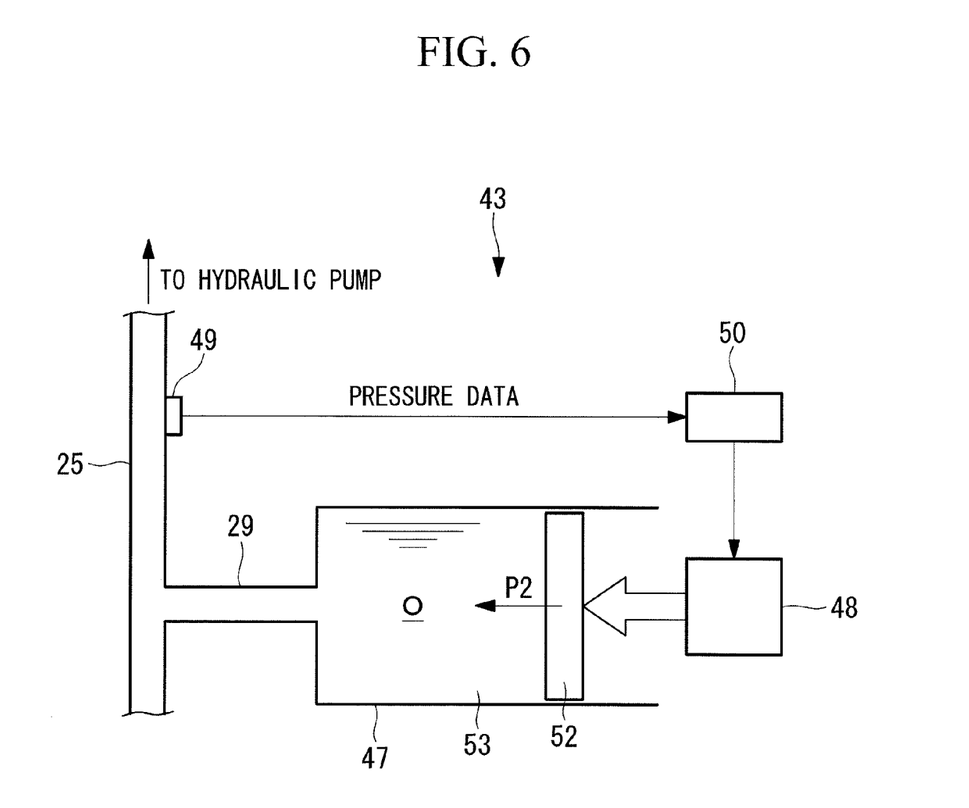
FIG. 6 is a longitudinal sectional view showing, in outline, the configuration of a pressure control unit shown in FIGS. 4 and 5.

FIG. 6 is a longitudinal sectional view showing, in outline, the configuration of the pressure control unit 43 shown in FIGS. 4 and 5. The pressure control unit 43 is equipped with a variable-capacity oil reservoir container 47 connected to the low-pressure oil line 25 via the connecting line 29 and storing a predetermined amount of oil, a capacity changing mechanism 48 that changes the capacity of the oil reservoir container 47, a pressure sensor 49 (pressure measuring means) that measures the internal pressure of the low-pressure oil line 25, and a controller 50 (control means). The pressure sensor 49 may be provided inside the oil reservoir container 47; however, it is most preferable that it be installed at the location of the low-pressure oil line 25 as close as possible to the hydraulic pump 22. The controller 50 may be integrated with the control unit 26 that controls the hydraulic actuators 15 and the hydraulic pump 22.

The oil reservoir container 47 is shaped like a cylinder having a predetermined capacity, wherein the connecting line 29 extends from one end of the oil reservoir container 47, a pressure adjusting piston 52 is inserted from the other end of the oil reservoir container 47 so as to be slidable, in a liquid-tight manner, and an oil reservoir chamber 53 is formed inside the oil reservoir container 47. The oil reservoir chamber 53 stores, for example, several liters of surplus oil O. The pressure adjusting piston 52 is driven by the capacity changing mechanism 48 in a direction in which it is pushed into the oil reservoir container 47.

The pressure data of the low-pressure oil line 25 measured by the pressure sensor 49 is output to the controller 50, and the controller 50 controls the capacity changing mechanism 48 on the basis of the pressure data so that the optimum pre-pressure P2 (for example, about 5 MPa) is constantly applied to the low-pressure oil line 25.

The hydraulic pump 22, the hydraulic control valves 21, and the pressure control unit 43 (controller 50) are connected to the control unit 26 by the control lines 26a. The control unit 26 may be disposed in the rotor head 4. In the case where the control unit 26 is disposed in nacelle 3, the control lines 26a are disposed so as to pass through the rotating shaft 7 of the rotor head 4 via a slip ring (not shown).

Figure 7:
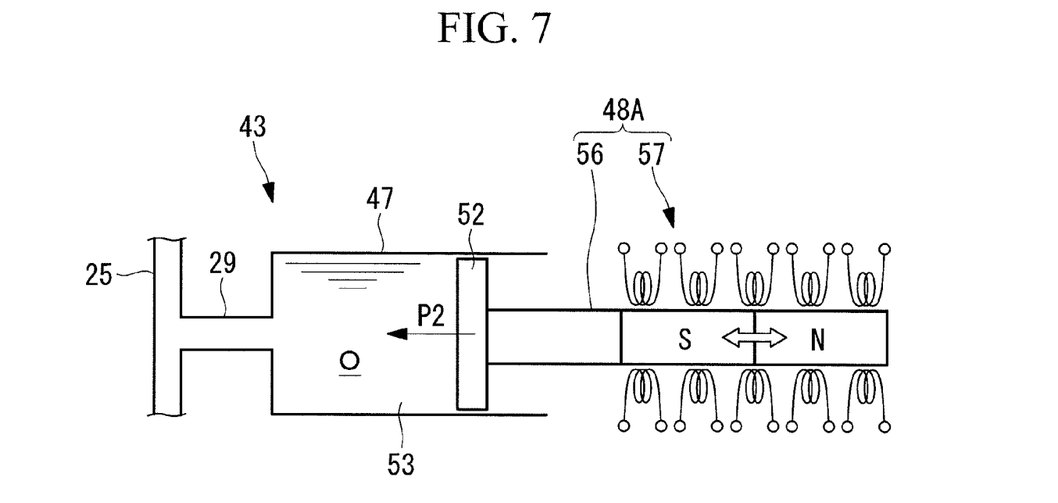
FIG. 7 is a longitudinal sectional view showing a first example of a capacity changing mechanism shown in FIG. 6.

FIG. 7 is a longitudinal sectional view showing a first example of the capacity changing mechanism 48.

This capacity changing mechanism 48A is configured such that one end of a magnetic pole rod 56 is connected to the pressure adjusting piston 52, and a plurality of solenoids (coils 57) are provided around the magnetic pole rod 56. Therefore, by selecting a solenoid 57 to be energized, the force with which the magnetic pole rod 56 pushes the pressure adjusting piston 52, that is, the pre-pressure P2 to be applied to the oil reservoir chamber 53, can be adjusted.

Figure 8:
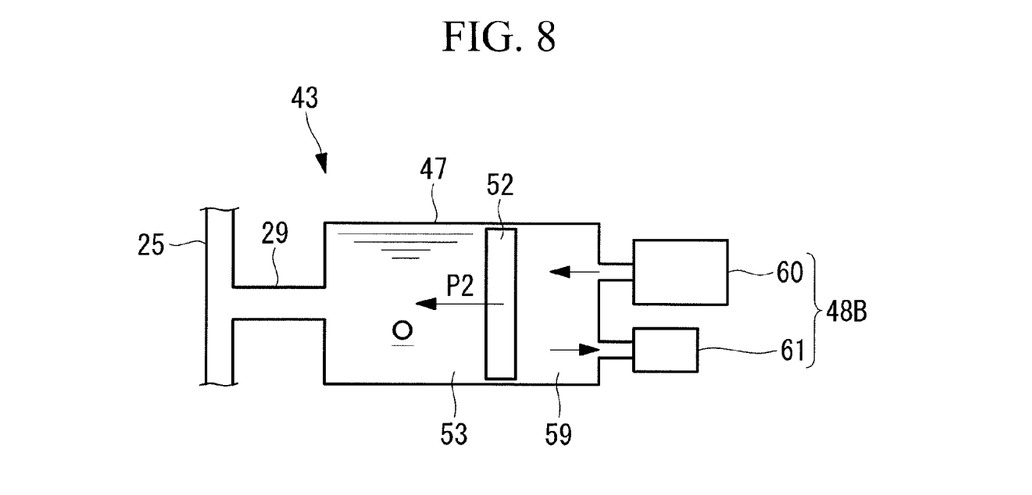
FIG. 8 is a longitudinal sectional view showing a second example of the capacity changing mechanism shown in FIG. 6.

FIG. 8 is a longitudinal sectional view showing a second example of the capacity changing mechanism 48.

This capacity changing mechanism 48B is configured such that the interior of the oil reservoir container 47 is divided into the oil reservoir chamber 53 and a pneumatic chamber 59, with the pressure adjusting piston 52 therebetween. The pneumatic chamber 59 connects to an air compressor 60 and an air escape valve 61, and when the pressure in the oil reservoir chamber 53 is to be increased, the air compressor 60 is driven to fill the pneumatic chamber 59 with compressed air, and when the pressure in the oil reservoir chamber 53 is to be reduced, the air escape valve 61 is opened, so that the compressed air in the pneumatic chamber 59 is released outside. Thus, the pre-pressure P2 with which the pressure adjusting piston 52 pushes can be adjusted.

The operation of the thus-configured pitch driving unit 42 is the same as that of the pitch driving unit 12 of the first embodiment. However, the pitch driving unit 42 is configured such that all the components, that is, the hydraulic actuators 15, the hydraulic pump 22, the high-pressure oil line 24, the low-pressure oil line 25, and the pressure control unit 43, are accommodated together in the rotor head 4. This allows the entire pitch driving unit 42 to be formed as a unit and to be accommodated in the rotor head 4, thus eliminating the need for a hydraulic line between the nacelle 3 and the rotor head 4. This can therefore eliminate the rotary joint 31 of the first embodiment, thus allowing the manufacturing cost of the pitch driving unit 42 to be remarkably reduced.

Moreover, since the entire pitch driving unit 42 can be formed as a unit and can be sealed from the outside, the need for the work of connecting a hydraulic line at the construction site of the wind power generator 41 can be completely eliminated, and contamination and so on inside the hydraulic pipe can be prevented.

Furthermore, since the pressure control unit 43 of the pitch driving unit 42 is equipped with the variable-capacity oil reservoir container 47 connected to the low-pressure oil line 25 and storing a predetermined amount of oil, the capacity changing mechanism 48 that changes the capacity of the oil reservoir container 47, the pressure sensor 49 that measures the pressure in the low-pressure oil line 25, and the controller 50 that controls the capacity changing mechanism 48 while detecting the pressure data from the pressure sensor 49 so that the optimum pre-pressure P2 is applied to the low-pressure oil line 25, the optimum pre-pressure P2 can be constantly applied to the low-pressure oil line 25, thereby assuredly preventing the generation of negative pressure at the oil intake portion of the hydraulic pump 22.

Thus, with the pitch driving units 12 and 42 according to the embodiments, and the wind power generators 1 and 41 equipped with the same, the hydraulic pump 22 can be prevented from taking in air, which would cause a malfunction, with a simple and low-cost configuration. Furthermore, the configuration of the closed hydraulic circuits 32 and 44 that do not open to the atmosphere can prevent the oil from leaking in the nacelle 3 and the rotor head 4, thereby avoiding contamination of the components. Furthermore, since the oil is not exposed to air, degradation of the oil, and intrusion of foreign substances can be prevented, and the amount of oil consumed can be reduced, thus contributing to cost reduction and environmental preservation, as well as a wind power generator equipped with the same.

The present invention is not limited to the configurations of the foregoing embodiments; various changes and modifications can be made without departing from the spirit of the present invention, and such changed or modified embodiments are also included in the scope of the right of the present invention.

For example, the positions at which the pressure control units 28 and 43 are connected to the low-pressure oil line 25 and the configurations of the pressure control units 28 and 43, the capacity changing mechanism 48 and so on are not necessarily limited to the forms in the foregoing embodiments and may take other forms.

What is claimed is:

1. A pitch driving unit for a wind-turbine rotor blade in which a wind turbine blade is mounted to a rotor head that is rotatably supported by and rotates about a nacelle, the pitch driving unit comprising:
   a hydraulic actuator that changes the pitch angle of the wind turbine blade;
   a hydraulic pump that supplies oil to the hydraulic actuator;
   a high-pressure oil line that guides the oil discharged from the hydraulic pump to the hydraulic actuator;
   a low-pressure oil line that returns the oil discharged from the hydraulic actuator to the hydraulic pump; and a pressure control unit that stores a predetermined surplus amount of the oil and that refills the low-pressure oil line with the stored oil while applying a minimum pre-pressure so that no negative pressure at an oil intake portion of the hydraulic pump is caused, wherein the hydraulic actuator, the hydraulic pump, the high-pressure oil line, the low-pressure oil line, and the pressure control unit constitute a closed hydraulic circuit that does not open to the atmosphere, the closed hydraulic circuit being filled with the oil, wherein the pressure control unit includes:

an oil tank installed at the nacelle side;

a connecting line that connects the oil tank to the low pressure oil line; and a gravity pre-pressurizing member that applies the minimum pre-pressure to the surface of the oil stored in the oil tank by gravity, wherein the low-pressure oil line is installed at the rotor head side, and the connecting line is connected to the low-pressure oil line via a rotary joint, and wherein the pressure control unit refills the low pressure oil line by the stored oil with said minimum pre-pressure during an operation of the pitch driving unit in which the pitch angle of the wind turbine blade is being adjusted in accordance with wind conditions in order to rotate the wind-turbine rotor blade at a desired rotational speed.

2. A pitch driving unit for a wind-turbine rotor blade in which a wind turbine blade is mounted to a rotor head that is rotatably supported by and rotates about a nacelle, the pitch driving unit comprising:

a hydraulic actuator that changes the pitch angle of the wind turbine blade;

a hydraulic pump that supplies oil to the hydraulic actuator;

a high-pressure oil line that guides the oil discharged from the hydraulic pump to the hydraulic actuator;

a low-pressure oil line that returns the oil discharged from the hydraulic actuator to the hydraulic pump; and a pressure control unit that stores a predetermined surplus amount of the oil and that refills the low-pressure oil line with the stored oil while applying a minimum pre-pressure so that no negative pressure at an oil intake portion of the hydraulic pump is caused, wherein the hydraulic actuator, the hydraulic pump, the high-pressure oil line, the low-pressure oil line, and the pressure control unit constitute a closed hydraulic circuit that does not open to the atmosphere, the closed hydraulic circuit being filled with the oil, and wherein the pressure control unit includes:

a variable-capacity oil reservoir container which is connected to the low-pressure oil line and which stores a predetermined amount of the oil;

a capacity changing mechanism that changes the capacity of the oil reservoir container;

a pressure measuring element that measures the pressure in the low-pressure oil line; and a control element that controls the capacity changing mechanism while detecting pressure data from the pressure measuring element so that the minimum pre-pressure is applied to the low-pressure oil line.

3. The pitch driving unit for the wind-turbine rotor blade according to claim 1, wherein the hydraulic actuator, the hydraulic pump, the high-pressure oil line, the low-pressure oil line, and the pressure control unit are all accommodated in the rotor head.

4. A wind power generator equipped with the pitch driving unit for the wind-turbine rotor blade according to claim 1.

* * * * *